Patented July 23, 1929.

1,721,798

UNITED STATES PATENT OFFICE.

CARLO TONIOLO, OF MILAN, ITALY.

DRYING PROCESS FOR AMMONIUM NITRATE SOLUTIONS.

No Drawing. Application filed January 27, 1926, Serial No. 84,252, and in Italy February 7, 1925.

This invention relates to processes of drying ammonium nitrate solutions and it comprises a process in which solid ammonium nitrate is dissolved in an ammonium nitrate solution of relatively high concentration under heating and the heated mixture is then sprayed or otherwise cooled so that the crystallization of the ammonium nitrate acts to evaporate the water present.

The boiling temperatures of ammonium nitrate water solutions rapidly increase with increasing concentrations.

For instance, 50% solutions of $NH_4NO_3$ boil at 110° C., 70% solutions at 118°, 80% solutions at 127° C., 90% solutions at 145° C., 95% solutions perhaps in the neighborhood of 200° C. if a partial decomposition of the salt were not taking place in the meantime.

At 150°–155° C. the salt is no longer stable; in metallic apparatus losses due to dissociation occur as low as 145° C., and even at lower temperatures if the salt be kept therein over long periods.

The metallic apparatus used for the evaporation of ammonium nitrate solutions are liable to rapid corrosion and the repairing expenses involved in conjunction with said losses render the process a practically very costly one.

I have found that temperatures of about 125° C. should not be practically exceeded and that it would be better to stop at about 100° C. I have also found that this can be realized with the use of very simple means.

It can be readily calculated that the latent heat of a molten mass of ammonium nitrate is such that, on being set free through the solidification of the mass, it can produce the spontaneous evaporation of the water eventually contained in the salt up to a quantity of about 10% of the salt weight; on the other hand concentrations of at least 90% $NH_4NO_3$ can be reached by dissolving the dry salt with more diluted solutions. In performing such solutions latent fusion heat is accumulated in the product, this fusion heat being later transformed into latent vaporization heat when the water is vaporized.

Example.

1. If 90 kilos of dry ammonium nitrate are dissolved in 100 kilos of a 90% $NH_4NO_3$ solution, it is necessary to heat to 120–125° C. according to the salt's degree of purity. This solution when sprayed into a current of dry air, or mixed with pulverized substances or dealt with in any other manner suited to bring about its rapid solidification so as to enable the water to absorb the liberated latent heat and to evaporate, supplies a dry product with an extreme facility.

With the ordinary methods it would be necessary to evaporate at 145°–150° C. instead of at 120°–125° C. and in addition partial vacuum apparatus would have to be used.

2. If 100 kilos dry ammonium nitrate are dissolved in an 80% solution of ammonium nitrate it suffices to heat to 85°–90° C. to obtain a solution to be sprayed or otherwise treated as in Example No. 1, whereas if the same concentration were to be attained in apparatus working at atmospheric pressure, it would be necessary to carry the temperature as far as 145°–150° C.

Having now particularly described and ascertained the nature of my said invention and in what manner the same is to be performed, I declare that what I claim is:—

1. In the process of preparing dry ammonium nitrate the step which comprises dissolving solid ammonium nitrate in a concentrated ammonium nitrate solution with the aid of heat at a temperature not exceeding about 125° C., the added nitrate being in sufficient quantity so that the latent heat of solidification liberated on solidification thereof will evaporate substantially all of the water present.

2. In the process of preparing dry ammonium nitrate, the steps which comprise dissolving solid ammonium nitrate with the aid of heat at a temperature not exceeding 125° C. in a concentrated ammonium nitrate solution, the quantity of added nitrate being such that the latent heat of solidification liberated on solidification thereof will evaporate substantially all the water present and the quantity being such that substantially all dissolves at a heating temperature not exceeding about 125° C., and then allowing the nitrate solution to crystallize.

Signed at Milan (Italy), this 13th day of January, 1926.

CARLO TONIOLO.